United States Patent
Ram

(10) Patent No.: US 9,469,430 B2
(45) Date of Patent: Oct. 18, 2016

(54) REUSABLE, COLLAPSIBLE, STORAGE CONTAINER

(71) Applicant: Phea Ram, North Chesterfield, VA (US)

(72) Inventor: Phea Ram, North Chesterfield, VA (US)

( * ) Notice: Subject to any disclaimer, the term of this patent is extended or adjusted under 35 U.S.C. 154(b) by 34 days.

(21) Appl. No.: 14/253,237

(22) Filed: Apr. 15, 2014

(65) Prior Publication Data

US 2014/0319132 A1  Oct. 30, 2014

Related U.S. Application Data

(60) Provisional application No. 61/817,010, filed on Apr. 29, 2013.

(51) Int. Cl.
*B65D 5/36* (2006.01)
*B65D 5/02* (2006.01)

(52) U.S. Cl.
CPC .......... *B65D 5/3621* (2013.01); *B65D 5/0236* (2013.01); *B65D 2313/02* (2013.01); *B65D 2313/04* (2013.01); *Y02W 30/807* (2015.05)

(58) Field of Classification Search
CPC ........ B65D 5/0254; B65D 3/20; B65D 5/02; B65D 5/0236; B65D 5/3621
USPC ............ 229/122, 126, 127, 128, 144, 103.3; 220/4.29, 62, 7; 206/425
See application file for complete search history.

(56) References Cited

U.S. PATENT DOCUMENTS

| | | | | |
|---|---|---|---|---|
| 2,437,058 A | * | 3/1948 | Waters ................ | B65D 88/522 217/12 R |
| 2,995,290 A | * | 8/1961 | Swanson et al. ............ | 229/143 |
| 3,768,642 A | * | 10/1973 | Hansen ................. | B65D 85/16 206/321 |
| 4,034,909 A | | 7/1977 | Toda | |
| 4,236,740 A | * | 12/1980 | Sorenson et al. ............ | 229/143 |
| 4,333,602 A | | 6/1982 | Geschwender | |
| 4,556,167 A | | 12/1985 | Fox et al. | |
| 5,474,171 A | * | 12/1995 | Niesen ................. | B65D 5/5021 206/372 |
| 5,887,782 A | | 3/1999 | Mueller | |
| 6,045,037 A | | 4/2000 | Mcgeehin | |
| 6,095,409 A | * | 8/2000 | Tsai ....................... | B65D 71/02 229/125.37 |
| 6,427,907 B1 | | 8/2002 | Espinoza et al. | |
| 7,014,057 B2 | | 3/2006 | Wang | |
| 7,481,355 B2 | | 1/2009 | Hui | |
| 8,191,762 B2 | * | 6/2012 | Philips ................ | B65D 5/2076 229/120.11 |

(Continued)

FOREIGN PATENT DOCUMENTS

EP  0810156 B1  11/2001
WO  9607578  3/1996

(Continued)

*Primary Examiner* — Robert J Hicks
*Assistant Examiner* — Kareen Thomas

(57) ABSTRACT

The present invention provides for a container that may be repeatedly used for moving and stored in a collapsed position when not in use. The container includes means for both longitudinal and transverse reinforcement of closed opposing flaps that make up the top and bottom portions of the container. In one embodiment is provided a container comprising: a plurality of side walls configured to provide a collapsible container, where each side wall is in operable communication with two other side walls; two foldable flaps in operable communication with each side wall; and at least one securing strip in operable communication with at least one of the foldable flaps, where the securing strip provides structure for releasable attachment with three different side walls and for securing four of the flaps in a closed position to form a container bottom or top.

17 Claims, 4 Drawing Sheets

(56) References Cited

U.S. PATENT DOCUMENTS

| | | | |
|---|---|---|---|
| 8,701,975 B2 * | 4/2014 | Farris | B65D 5/6647 220/315 |
| 2007/0000986 A1 * | 1/2007 | McClure | B65D 5/443 229/143 |
| 2010/0163563 A1 | 7/2010 | Lutzig | |
| 2010/0187836 A1 | 7/2010 | Mason | |
| 2012/0024941 A1 | 2/2012 | Skinner | |

FOREIGN PATENT DOCUMENTS

| | | |
|---|---|---|
| WO | 9736790 A1 | 10/1997 |
| WO | 0076859 A | 12/2000 |
| WO | 03045796 A1 | 6/2003 |
| WO | 2006002524 A1 | 1/2006 |

* cited by examiner

REUSABLE, COLLAPSIBLE, STORAGE CONTAINER

CROSS REFERENCE TO RELATED APPLICATIONS

This application claims priority to and the benefit of the filing date of U.S. Provisional Application No. 61/817,010, filed Apr. 29, 2013, the disclosure of which is hereby incorporated by reference herein in its entirety.

BACKGROUND OF THE INVENTION

1. Field of the Invention

The present invention relates to containers that can be used for moving and/or storage. Particular embodiments of the invention provide a moving container that can be assembled for moving then collapsed for storage repeatedly, while providing sufficient reinforcement and support for carrying moved loads.

2. Description of Related Art

Collapsible containers used for moving are known in the art. A standard moving container is formed from a sheet of cardboard comprising panels with foldable flaps that form the top and bottom portions of the container. The customary means of securing the top and bottom portions of the container has been through the application of strips of adhesive tape along the edges of the flaps to reinforce the areas between the flaps and between the flaps and panels. However, a prevailing limitation with this arrangement is that, once the move is complete and the contents of the container have been removed, the tape is difficult to remove from the cardboard panels and flaps without severe damage to the cardboard or the tape. The fact that the assembly of the box uses permanent adhesive tape that cannot be re-used severely limits the ability to convert an assembled box back to a collapsed form for storage until the next move.

Various attempts have been made to provide collapsible containers with resealable means for securing the flaps. For example, a number of attempts have been made to use hook and loop-type fasteners (VELCRO being the most commonly known) as a resealable mechanism for closing the flaps of a container. See, for example, U.S. Pat. Nos. 4,034,909; 4,556,167; 4,333,602; 6,045,037; and 7,014,057; and Published International Patent Application WO 2000/076859 A1, the disclosures of which are hereby incorporated by reference herein in their entireties. These attempted solutions typical employ some configuration of complementary strips of VELCRO that are fixed to the flaps and panels with an adhesive. However, these configurations, while lacking the disadvantage of adhesive tape, also tend to provide poor reinforcement of the top and bottom portions and therefore cannot withstand the heavy loads that are often required when moving. Further, these configurations also have the disadvantage in that when collapsed containers are stacked next to each other during storage, it is possible for a complementary VELCRO strip from one box to catch a complementary strip of an adjacent box, causing adjacent containers to become stuck. Other containers have been described in U.S. Pat. Nos. 5,887,782; 7,481,355; and 6,427,907; as well as in U.S. Published Patent Application Nos. 2010/0187836; 2012/0024941; and 2010/0163563; in European Publication No. EP0810156 B1, and International Patent Application Publication Nos. WO 2006/002524 A1; WO 2003/045796 A1; WO 1997/036790 A1; and WO 1996/007578 A1, the disclosures of which are hereby incorporated by reference herein in their entireties.

The art has still not provided a satisfactory solution to this problem, and the standard box available to the consumer for moving remains cardboard sheets with folding lines to prepare a box assembled with non-reusable adhesive tape. Thus, there is a need in the art for a reusable, collapsible storable container with securing means that can be reused over and over again for moving.

SUMMARY OF THE INVENTION

It is an objective of embodiments of the invention to provide a container that may be easily and repeatedly assembled for use in moving and collapsed for storage so that it may be used over and over. Other uses of containers according to embodiments of the invention include use as a foldable lunch box; a jewelry box such as for children; a science project board, a display board, or a presentation board; and as an action figure diorama display board.

In an embodiment is provided is a container comprising: a plurality of side walls configured to provide a collapsible container, where each side wall is in operable communication with two other side walls; two foldable flaps in operable communication with each side wall; and at least one securing strip in operable communication with at least one of the foldable flaps, where the securing strip provides structure for releasable attachment with three different side walls of the plurality of side walls and for securing four of the flaps in a closed position to form a container bottom or top.

A primary objective of the invention includes providing a container that may be assembled without the use of adhesive tape while simultaneously providing secure reinforcement of the top and bottom portions of the container so that it is suitable for use as a moving container, especially for objects with substantial weight.

It is another objective of the invention to provide a container that may be collapsed and stored with other containers in collapsed form. In embodiments, the container is configured such that the flap securing structure of one container has a minimal capability of adhering to the container or the securing structure of the container, or another container or the securing structure of another container. In preferred embodiments, one collapsible container of the invention stored with another container will not adhere to the other container.

To achieve the above objectives, container embodiments of the present invention can include complementary reinforcement means for reinforcing a pair of opposing flaps that make up the top and bottom portions of the container. The complementary reinforcement means includes a means for longitudinal reinforcement of the opposing flaps relative to the seam where the opposing flaps meet when they are in the closed position, and a means for transverse reinforcement of the opposing flaps relative to the seam. The complementary reinforcement means are secured to side panels of the container through releasable securing means which provides for reversible assembly and disassembly of the container. The complementary reinforcement means are attached to one of the opposing flaps and may be secured to it in a stowed position.

In one embodiment, the invention provides a reusable, collapsible, storable container, comprising a sheet of foldable material comprising folding lines, two pairs of cooperating reinforcement means, and a plurality of releasable securing means. The sheet of foldable material can be a single sheet of material, or comprised of one or more sheets of material joined together. The sheet of material can be configured to provide a ring-like structure, e.g., each of four side walls of the container is in operable communication with at least two other walls of the four side walls. The folding lines define four or more side panels and a pair of flaps, extending on opposite sides of each of the panels, wherein the opposite sides correspond to the top and bottom portions of the container when it is in its assembled form. In an alternate embodiment, there are four side walls and only two flaps, one to form a closed top and the other to form a closed bottom. The top and bottom portions each container comprise an inner pair of opposing flaps and an outer pair of opposing flaps, wherein the flaps cooperate to form said top and bottom portions when folded inward and the outer pair of opposing flaps meet at a seam when the flaps are in the closed position at each of the top and bottom portions. Where there may be only one flap on the top of the box or container, the flap is of a shape and size to meet at three seams around the perimeter of the top or bottom of the box. One pair of cooperating reinforcement means reinforces the top portion of the container and the other pair of cooperating reinforcement means reinforces the bottom portion of the container such that one member of each pair of reinforcement means provides for longitudinal reinforcement of the seam and the other member provides for transverse reinforcement of the top or bottom portion relative to the seam. Further, releasable securing means are attached to said cooperating reinforcement means and said side panels in a configuration that allows said reinforcement means to be secured to the side panels. The cooperating reinforcement means and releasable securing means provide for reversible conversion between collapsed and assembled forms of the container without the use of adhesive tape.

In another embodiment, the invention provides a reusable, collapsible, storable container, comprising a sheet of foldable material comprising folding lines, wherein said folding lines define four side panels and a pair of flaps extending on opposite sides of each of the panels, wherein the opposite sides represent the top and bottom portions of the container when it is in its assembled form. The top and bottom portions each comprise an inner pair of opposing flaps and an outer pair of opposing flaps, wherein the flaps cooperate to form said top and bottom portions when folded inward and the outer pair of opposing flaps meet at a seam when the flaps are in the closed position at each of the top and bottom portions. The container includes two pairs of straps wherein one pair is attached to one of the opposing flaps on the top portion of the container and the other pair is attached to one of the opposing flaps on the bottom portion, wherein one member of each pair substantially overlaps and provides for longitudinal reinforcement of the seam and the other member provides for transverse reinforcement of the top or bottom portion relative to the seam. Further, the container includes releasable securing means attached to end portions of said straps and at least three of the side panels, wherein the releasable securing means are positioned so that corresponding securing means on each strap may be attached to corresponding securing means on each panel, wherein the straps when secured to said side panels through releasable securing means reinforce said top and bottom portions by keeping the flaps in the closed position when the container is assembled. The straps and releasable securing means provide for reversible conversion between collapsed and assembled forms of the container without the use of adhesive tape.

In other aspects of embodiments of the invention, cooperating reinforcement means include straps and each pair of cooperating reinforcement means including straps is attached to one of the outer flaps on each of the top and bottom portions of the container.

In yet other aspects, the pairs of cooperating reinforcement means including straps are attached to outer flaps extending from the same side panel.

Still further aspects of the invention include embodiments where the longitudinal reinforcement means have two end portions extending on opposite ends and said transverse reinforcement means has one end portion extending on the end that is opposite to the end which it is attached and releasable securing means are attached to said end portions, and the length of said end portions provides for attachment to the releasable securing means on the side panels.

In embodiments, the flap to which longitudinal and transverse reinforcement means are attached further comprises releasable securing means positioned so that said end portions may be secured to said flap in a stowed position.

Embodiments can also include containers where the foldable material of the container may be paperboard, cardboard, or plastic.

In other aspects of embodiments of the invention, the longitudinal and transverse reinforcement means are straps made of any or any combination of plastic, natural fiber, synthetic fiber, animal hide, or elastic material.

In embodiments, releasable securing means may comprise any or any combination of hook and loop fabrics, press studs, latches, buckles, or magnets. In particular embodiments the magnets can be neodymium magnets, or a flexible magnetic strip, such as a dry mixture of ferrite powder and rubber polymer resin.

DETAILED DESCRIPTION OF EXEMPLARY EMBODIMENTS OF THE INVENTION

Reference will now be made to various figures showing exemplary embodiments of the invention. However, the embodiments described in the description and shown in the figures are illustrative only and are not intended to limit the scope of the invention, and changes may be made in the specific configurations and materials described in this specification and accompanying drawings that a person of ordinary skill in the art will recognize are within the scope and spirit of the invention.

Figure 1:
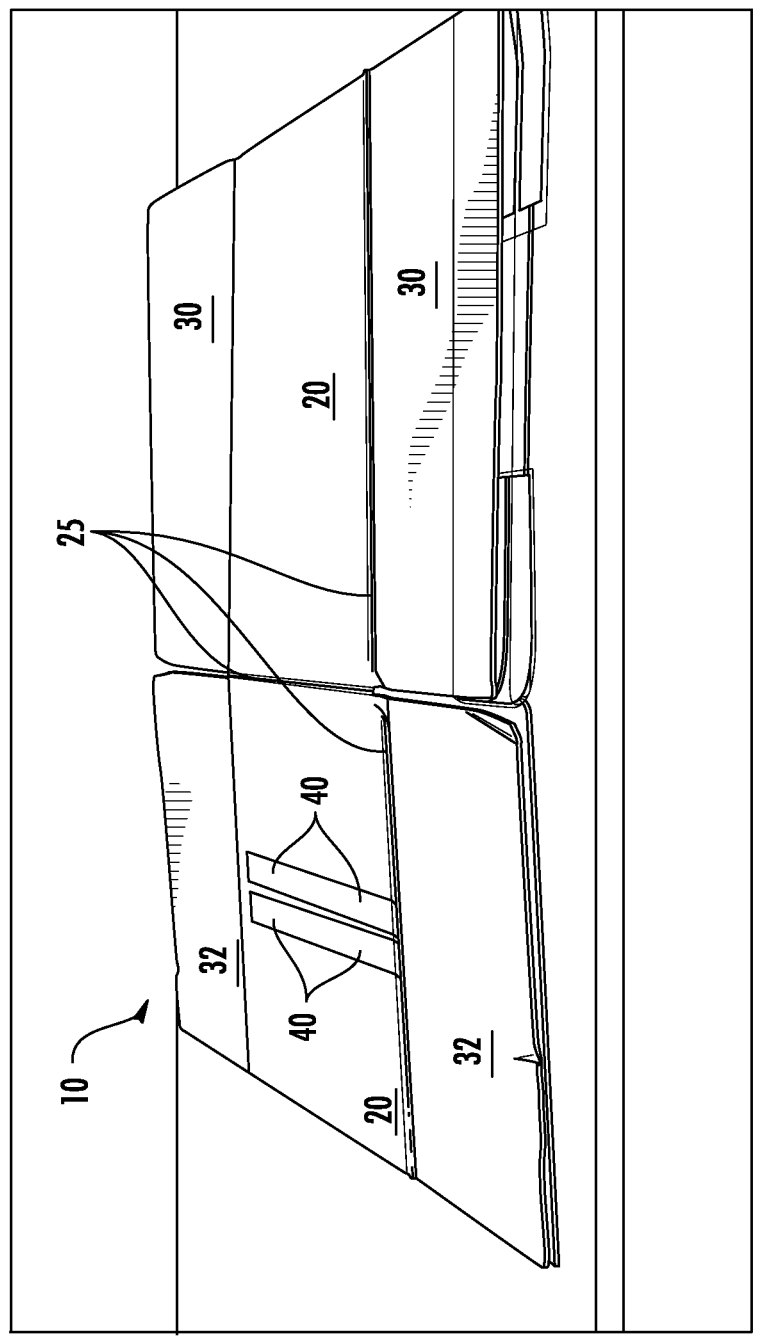
FIG. 1 is a drawing showing an embodiment of a container according to the invention in collapsed form.

Referring now to the drawings, FIG. 1 shows an exemplary container of the invention. The container as illustrated comprises: a plurality of side walls configured to provide a collapsible container, where each side wall is in operable communication with two other side walls; two foldable flaps in operable communication with each side wall; and at least one securing strip in operable communication with at least one of the foldable flaps, where the securing strip provides structure for releasable attachment with three different side walls of the plurality of side walls and for securing four of the flaps in a closed position to form a container bottom or top.

The container can be provided collapsed in a flattened form, which is indicated at 10, made from a foldable sheet material such as cardboard, paperboard, or plastic. The container in collapsed form has folding lines 25 defining side panels 20 as well as a pair of inner flaps 32 and a pair of outer flaps 30 that may form the top and bottom portions of the container when in a closed position. Disposed on one or more side panels 20, releasable securing means 40 are adhered. As shown, hook and loop type fasteners, such as VELCRO, can be used, as well as snaps, adhesive, etc. As illustrated, Containers in collapsed form are advantageously dimensioned for storage, particularly where multiple containers may be stacked on top of each other while taking up minimal space. The container as shown comprises a sheet of cardboard configured such that a single panel 20 is in operable communication with two other side panels 20. In embodiments, panels 20 can be provided as a single sheet of continuous material, or can be single panels joined together by a securing structure, such as adhesive tape strips, or can be single panels fused together, such as in joining two pieces of plastic. Four panels can be provided as a single sheet, where two of the panels of the sheet are joined/fused together to form part of an enclosure, e.g., a ring-like or fence-like enclosure. The securing structure can be a releasable or non-releasable securing means.

Figure 3:
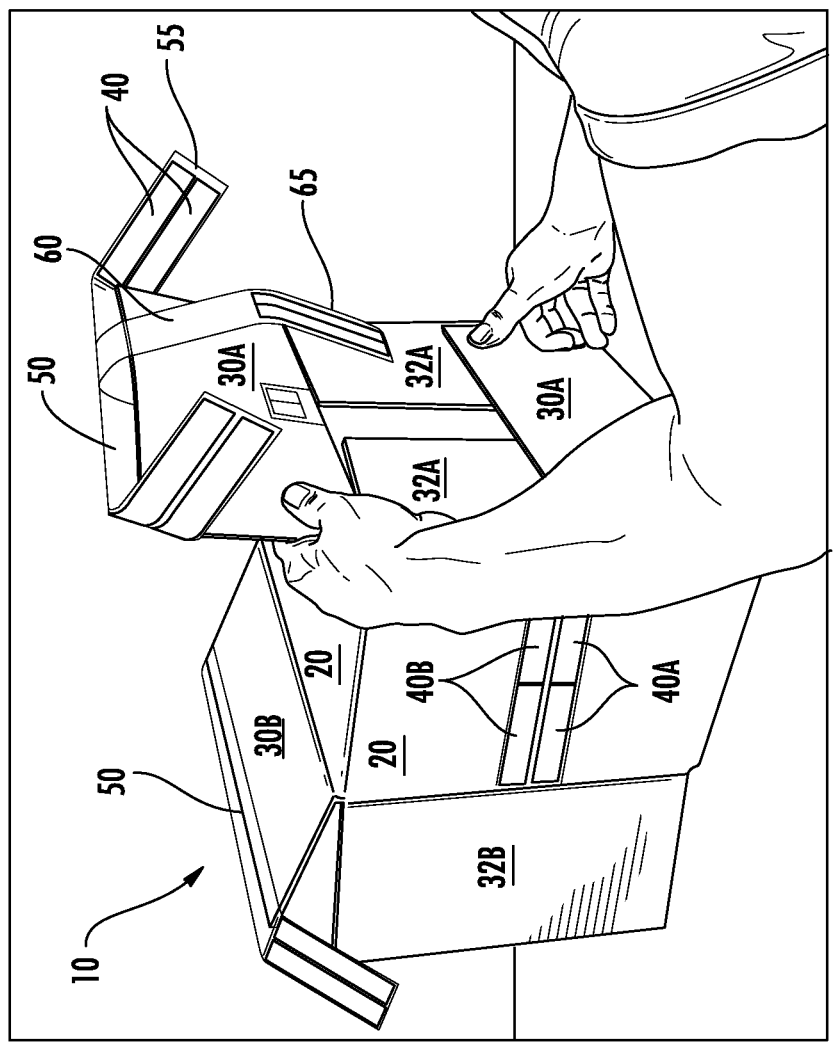
FIG. 3 is a drawing showing an embodiment of a container according to the invention which has one outer flap, corresponding to the bottom of the container, in a closed position disposed over the inner flaps.

In accordance with the invention, releasable securing means may be any complementary fastener used alone or in any combination. Examples of suitable securing means that may be used alone or in any combination include hook- and loop-type fasteners made of fabric (e.g. VELCRO), magnets, press studs, latches, buckles, and the like. For example, as shown in FIG. 3, Side panel 20 can be configured with releasable securing means, wherein 40A represents a loop-type fabric and 40B represents a complementary hook-type fabric. In particular embodiments, 40A and 40B, for example in FIG. 3, can be any releasable fastener, including magnets, such as neodymium magnets, or a flexible magnetic strip, such as a dry mixture of ferrite powder and rubber polymer resin. Releasable securing means may be adhered to said side panels 20 through any suitable adhesive or securing means.

The container 10 can be manipulated (e.g., folded, unfolded) at folding lines 25 so that adjacent side panels 20 are substantially perpendicular to each other along the folding lines 25 thus forming the side walls 20 of the container. Further, container 10 has, on one of the outer flaps 30, a longitudinal reinforcement means 50 and a transverse reinforcement means 60 attached thereto. This particular flap 30 may be referred to as a reinforcing flap as it provides complementary reinforcement means for reinforcing and securing the top or bottom portions of the container.

Longitudinal reinforcement means 50 has two end portions 55 folded inward on opposite sides. The longitudinal reinforcement means may be releasably secured to said outer flap 30 by way of releasable securing means. Similarly, transverse reinforcement means 60 has one end portion 65, which may be releasably secured to the outer flap 30 by way of releasable securing means. The longitudinal reinforcement means 50 and the transverse reinforcement means 60 may together comprise a flexible material joined to, fused with, or incorporated into a flap 30, 32 of the container. The desired flexibility may differ between applications, however, a fabric or plastic strip with the ability to be folded on itself and to be unfolded without deformation to the extent it is not re-useable is preferred. The configuration in which end portions 55 and 65 of reinforcement means 50 and/or 60 are secured to the reinforcing flap in a stowed position is particularly convenient when the containers 10 in collapsed form are stacked on or near each other in storage, thus preventing near or adjacent collapsed containers from adhering to each other through releasable securing means. Once the container is in such a position, it is ready to be assembled.

In accordance with the invention, longitudinal 50 and transverse 60 reinforcement means may be a strap, belt, or band made of any durable, flexible material, including various thin sheets of plastic such as polypropylene, polyvinyl, or other suitable polymers, woven natural fibers such as cotton or synthetic fibers such as polyester or nylon, animal hides such as leather, or any other suitable material. Longitudinal strap 50 is dimensioned in length so that its end portions 55 with releasable securing means 40 extend beyond the edges of the reinforcing flap and therefore may contact releasable securing means 40 adhered to a side panel 20, and in width so that it may cover and reinforce the seam where two outer flaps 30 at each end of the container meet when they are in the closed position.

For example, longitudinal strip or strap 50 may be the same length, shorter, or longer than the length of flap 30, 32. Preferably, longitudinal strip 50 may have a length that is from 10% to 500% of the length of flap 30, 32, such as from about 50% to about 200% of the length of flap 30 or 32, such as from 100% to 175% of the length of the flap to which it is in communication with. Preferably end portions 55 extend beyond the length of flap 30, 32. Thus, the length of end portions 55 (the length of material extending beyond the length of the flap to which they are attached) may together or separately have a length of from 0-50% of the length of flap 30, 32, such as extending about 25-40%, or about 10-35%, such as about 30-33% of the length of the flap beyond the length of the flap.

In embodiments end portions 55 of longitudinal strap and end portion 65 of transverse strap extend beyond the edges of the flaps. In embodiments, transverse strap or strip 60 is dimensioned in length so that its end portion 65 extends beyond the opposing outer flap 30 of the container so that the end portion 65 with releasable securing means 40 may contact complementary securing means 40 disposed on a side panel of the container, and wide enough so that it may exert an inward force on opposing outer flaps 30 and keep them closed and secured when the container is assembled. In embodiments, the length of the transverse strap 60 is at least as long as the width of flap 30, 32 and preferably has a length of about 100% to about 500% of the width of the flap to which it is in communication with. Most preferably, the transverse strap 60 has a length ranging from 150% to 250%, or from 125% to 200%, of the width of the flap. The longitudinal and transverse straps, belts, or bands may be attached to the reinforcing flap 30, 32 by any suitable means, such as through the use of an adhesive, stapling, fusion, to name a few. Releasable securing means may be attached to said straps through any suitable adhesive or coupling device.

Longitudinal 50 and transverse 60 straps can be made of an elastic material such as interwoven strands of rubber, spandex, or similar synthetic material. In this embodiment, the longitudinal 50 and transverse 60 straps may be stretched in length when the straps are secured to the side panels 20 through releasable securing means 40, such that the elastic properties of the material exert an inner compressive force on the opposed outer flaps 30 when the straps are secured. In embodiments, the elastic material can be selected such that it is capable of stretching from 20-500% of its at-rest length, such as from 30-300%, or from 40-200%, or from 50-100% of its at-rest length.

Figure 2:
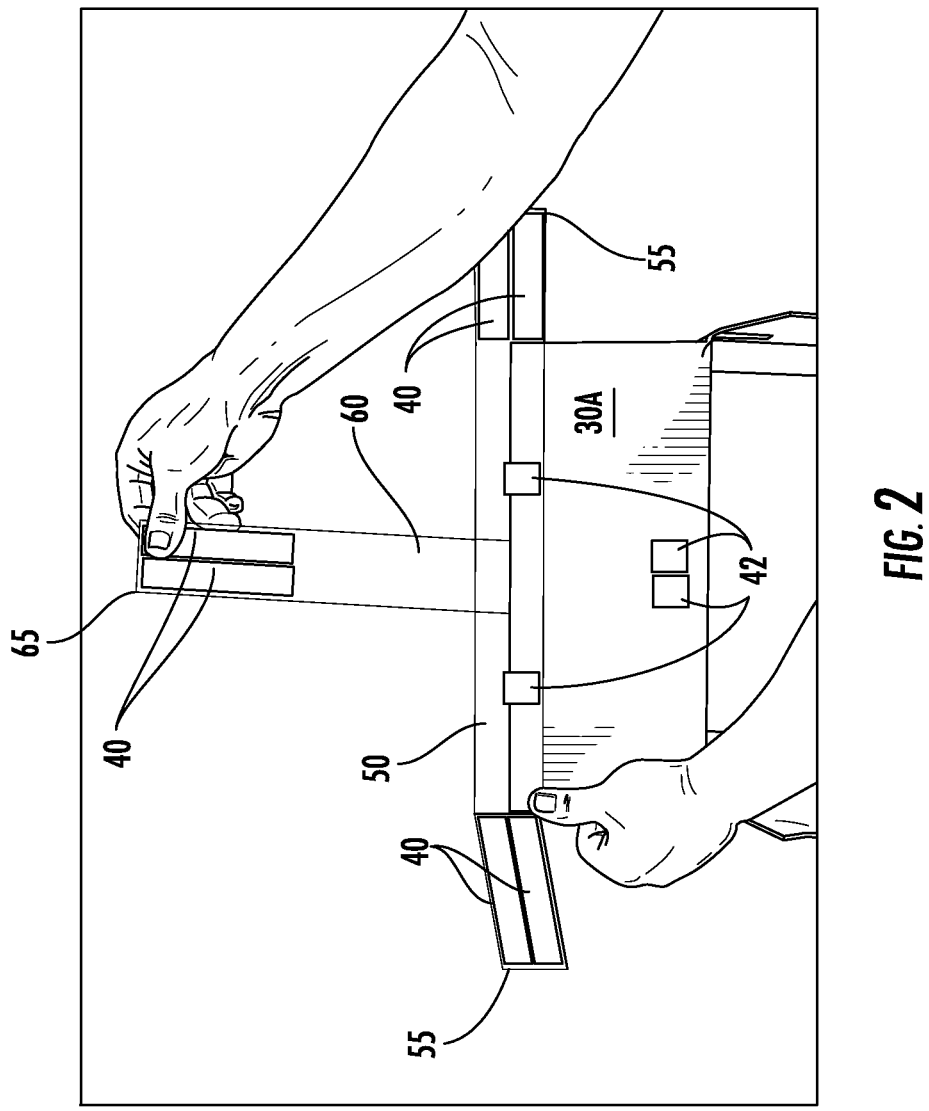
FIG. 2 is a drawing showing an embodiment of a container according to the invention which has end portions of the longitudinal and transverse reinforcement means extended in an open position.

FIGS. 2-3 show a sequence of actions for preparation of assembly of a container 10 according to an embodiment of the invention, beginning with an outer flap 30A corresponding to the bottom of the container that has attached thereto longitudinal reinforcement means 50 and transverse reinforcement means 60. End portions 55 of longitudinal reinforcement means 50 are unfolded from the stowed position by grasping the ends 55 to remove releasable securing means 40 on said end portion 55 from its complementary securing means 42 adhered to the reinforcing outer flap 30A. Similarly, FIG. 2 shows end portion 65 of transverse reinforcement means is similarly removed by removing releasable securing means 40 on said end portion 65 from complementary securing means 42 disposed in communication with the reinforcing outer flap 30A.

FIG. 3 shows side panels 20 with extending inner or outer pairs of flaps, wherein one member of each pair corresponds to the bottom portion of the container as designated by 32A and 30A and one member corresponds to the top portion as designated by 32B and 30B. Releasable securing means 40A and 40B on side panels 20 perpendicular and adjacent to the side panel 20 from which the reinforcing outer flap 30A extends from are positioned centrally within said side panel so that end portions 55 with releasable securing means 40 may engage them when the pair of opposed outer flaps 30A are in the closed position. In this embodiment, two sets of loop-type fabric 40A and two sets of hook-type fabric 40B are provided for securing complementary fabrics on end portions 55 of longitudinal reinforcement means 50 attached to the reinforcing outer flap 30A corresponding to the bottom portion of the container and the reinforcing outer flap 30B corresponding to the top portion. Similarly, releasable securing means on the side panel 20 that is parallel and opposite to the side panel 20 from which the reinforcing flap 30A extends from is also positioned centrally within said side panel 20 so that end portion 65 with releasable securing means 40 may engage with it (not shown).

FIGS. 2-3 show a sequence of actions for assembling the bottom portion of the container 10. As shown, inner flaps 32A corresponding to the bottom portion of the container are folded inward so that they are perpendicular to the side panels 20 and are thus in the closed position. Then, outer flap 30A opposite the flap having longitudinal 50 and transverse 60 reinforcement means attached thereto is similarly folded inward so that it covers inner flaps 32A. Then, reinforcing outer flap 30A is folded last, so that a portion of longitudinal reinforcement means covers the seam where both outer flaps 30A meet.

Figure 4:
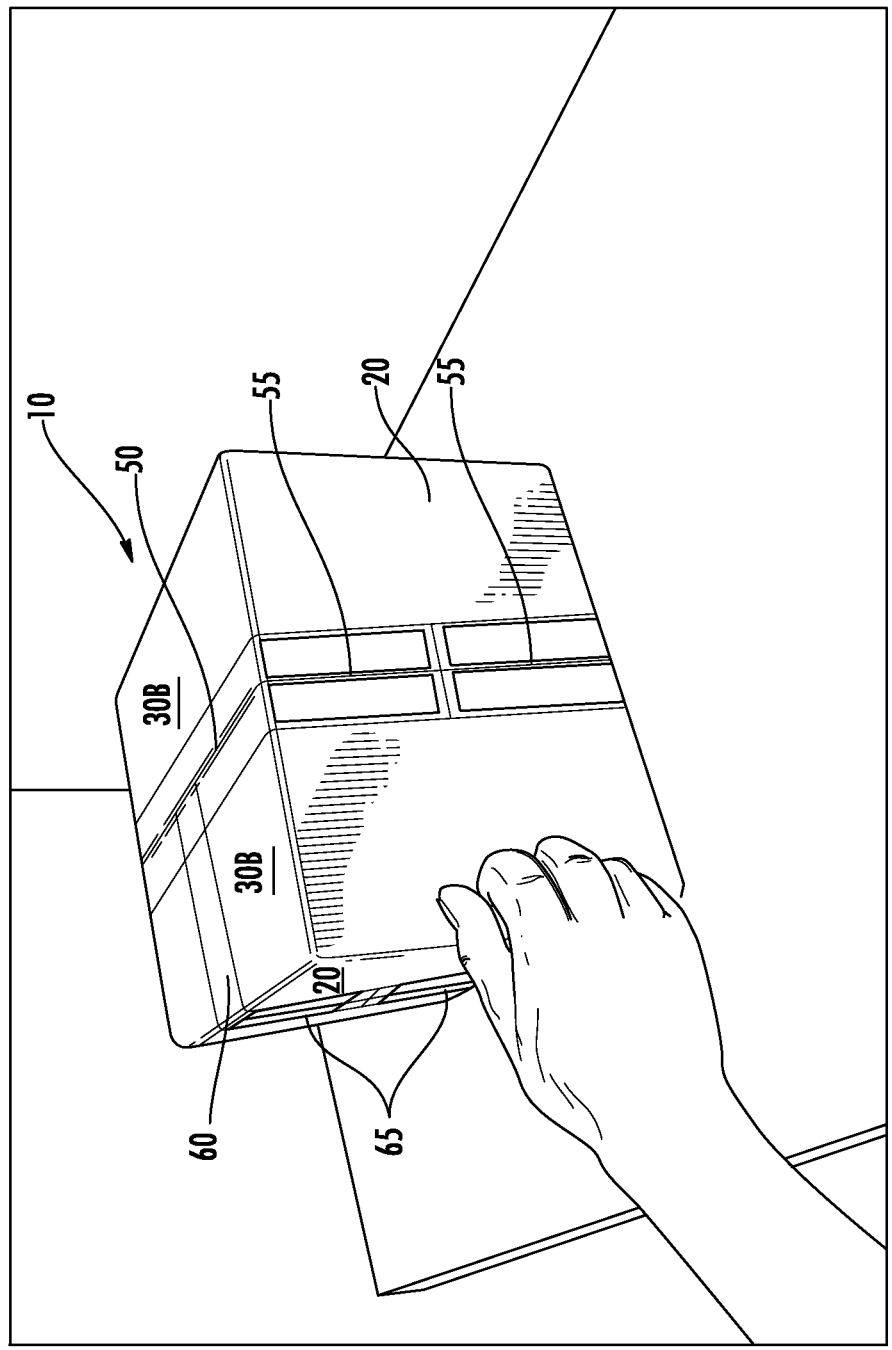
FIG. 4 is a drawing showing an embodiment of a container according to the invention in assembled form.

FIGS. 3-4 show a sequence of actions for completing the assembly of the bottom portion of the container. End portions 55 of longitudinal reinforcement means 50 are secured to side panels 20 of the container through releasable securing means 40, while end portion 65 of transverse reinforcement means is similarly secured to a corresponding side panel. As shown, end portions 55 are attached to the side panels 20 that are adjacent and perpendicular to the side panel 20 from which the reinforcement flap 30A extends from, as end portions 55 will overlap a portion of these side panels 20 when the opposed outer pair of flaps 30A are in the closed position. End portion 65 is attached to the side panel 20 that is parallel and opposite to the side panel 20 from which the reinforcement flap 30A extends from as end portion 65 will overlap this side panel 20 when the opposed outer pair of flaps 30A are in the closed position. By securing longitudinal reinforcement means 50 to said side panels 20, the seam where opposed outer flaps 30A meet is longitudinally reinforced. Similarly, by securing transverse reinforcement means 60 to its corresponding side panel 20, a transverse inward pressure relative to the seam is exerted on the opposed outer flaps 30A, keeping them in the closed position. The sequence of actions shown is merely exemplary and end portions 55 and 65 may be secured to side panels 20 in any order.

In a sequence of actions for assembling the top portion of the container 10, inner flaps 32B representing the top portion of the container are folded inward so that they are perpendicular to the side panels 20 and thus in the closed position. Then, outer flap 30B opposite the reinforcing flap 30B with reinforcement means attached thereto is similarly folded inward so that it covers inner flaps 32B. Then, the reinforcing flap 30B is folded last, so that portions of both reinforcement means cover the opposite flap 30B so that a portion of longitudinal reinforcement means 50 covers the seam where both opposed outer flaps 30B meet.

In a sequence of actions for completing the assembly of the top portion of the container and thus the container itself, end portions 55 of longitudinal reinforcement means 50 are secured to side panels 20 of container through releasable securing means 40, while end portion 65 of transverse reinforcement means is similarly secured to a corresponding side panel 20. As shown, end portions 55 are attached to the side panels 20 that are adjacent and perpendicular to the side panel 20 from which the reinforcing flap 30B extends from, as end portions 55 will overlap a portion of these side panels 20 when the opposed outer pair of flaps 30B are in the closed position. End portion 65 is attached to the side panel 20 that is parallel and opposite to the side panel 20 from which the reinforcing flap 30B extends from as end portion 65 will overlap this side panel 20 when the opposed outer pair of flaps 30B are in the closed position. By securing longitudinal reinforcement means 50 to said side panels 20, the seam where opposed outer flaps 30B meet is longitudinally reinforced. Similarly, by securing transverse reinforcement means 60 to said side panel 20, a transverse inward pressure relative to the seam is exerted on the outer flaps 30B, keeping them in the closed position. The sequence of actions described is merely exemplary and end portions 55 and 65 may be secured to side panels 20 in any order.

Once longitudinal 50 and transverse 60 reinforcement means are secured to the container on both sides, assembly of the container is complete, as shown in the configuration of FIG. 4. The reverse sequence of steps may be used to collapse the assembled container 10 (FIG. 4) back to an unfolded, collapsed state (FIG. 1). The container 10 may be easily disassembled due to the fact that releasable securing means 40 are used for securing the container instead of adhesive tape. The container 10 may be thus stored, reused, collapsed, stored, and reused over and over again without damage to the materials of the container. The container is highly convenient as a reusable, collapsible, storable moving box that can be reused over and over again.

The present invention has been described with reference to particular embodiments having various features. It will be apparent to those skilled in the art that various modifications and variations can be made in the practice of the present invention without departing from the scope or spirit of the invention. One skilled in the art will recognize that other materials or configurations may be substituted for those described herein that fall within the scope and spirit of the invention. Other embodiments of the invention will be apparent to those skilled in the art from consideration of the specification and practice of the invention. The description of the invention provided is merely exemplary in nature and, thus, variations that do not depart from the essence of the invention are intended to be within the scope of the invention.

The invention claimed is:

1. A reusable, collapsible, storable container, comprising:
   a. a foldable material comprising folding lines;
   b. two pairs of cooperating reinforcement means; and
   c. a plurality of releasable securing means;
   wherein:
   d. the folding lines define four side panels and a pair of flaps extending on opposite sides of each of the side panels, wherein opposite sides correspond to top and bottom portions of the container when it is in its assembled form;
   e. the top and bottom portions each comprise an inner pair of opposing flaps and an outer pair of opposing flaps, wherein the inner and outer pairs of flaps cooperate to form the top and bottom portions when folded inward;
   f. one pair of cooperating reinforcement means reinforces the top portion of the container and the other pair of cooperating reinforcement means reinforces the bottom portion of the container, such that a longitudinal strap provides for longitudinal reinforcement and a transverse strap provides for transverse reinforcement of the outer pair of opposing flaps relative to an edge of one of the flaps of the outer pair of opposing flaps;
   g. releasable securing means are attached to said cooperating reinforcement means and the side panels in a configuration that allows the reinforcement means to be secured to the side panels; and
   h. the reinforcement means and the releasable securing means provide for reversible conversion between collapsed and assembled forms of the container without the use of adhesive tape.

2. The container of claim 1, wherein each pair of cooperating reinforcement means is attached to one of the outer flaps on each of the top and bottom portions.

3. The container of claim 2, wherein the pairs of cooperating reinforcement means are attached to outer flaps extending from the same side panel.

4. The container of claim 1, wherein the longitudinal strap has two end portions extending on opposite ends and the transverse strap has one end portion extending on the end that is opposite to the end which it is attached and releasable securing means are attached to the end portions, and the length of the end portions provides for attachment to the releasable securing means on the side panels.

5. The container of claim 4, wherein the flap to which the longitudinal and transverse straps are attached further comprises releasable securing means positioned so that the end portions may be secured to said flap in a stowed position.

6. The container of claim 1, wherein the foldable material is paperboard, cardboard, or plastic.

7. The container of claim 1, wherein the longitudinal and transverse reinforcement means are straps made of any or any combination of plastic, natural fiber, synthetic fiber, animal hide, or elastic material.

8. The container of claim 1, wherein releasable securing means comprises any or any combination of hook and loop fabrics, press studs, latches, buckles, or magnets.

9. The container of claim 8, wherein the releasable securing means comprises neodymium magnets.

10. A reusable, collapsible, storable container, comprising:
    a. a sheet of foldable material comprising folding lines, wherein the folding lines define four side panels and a pair of flaps extending on opposite sides of each of the side panels, wherein the opposite sides represent the top and bottom portions of the container when it is in its assembled form;
    b. wherein the top and bottom portions each comprise an inner pair of opposing flaps and an outer pair of opposing flaps, wherein the inner and outer pairs of flaps cooperate to form said top and bottom portions when folded inward;
    c. two pairs of straps wherein one pair is attached to one of the opposing flaps on the top portion of the container and the other pair is attached to one of the opposing flaps on the bottom portion, wherein one member of each pair is a longitudinal strap that provides for longitudinal reinforcement and the other member is a transverse strap that provides for transverse reinforcement of the outer pair of opposing flaps relative to an edge of one of the flaps of the outer pair of opposing flaps; and
    d. releasable securing means attached to end portions of said straps and at least three of the side panels, wherein the releasable securing means are positioned so that corresponding securing means on each strap may be attached to corresponding securing means on each panel, wherein the straps when secured to the side panels through releasable securing means reinforce the top and bottom portions by keeping the flaps in the closed position when the container is assembled;
    e. wherein the straps and releasable securing means provide for reversible conversion between collapsed and assembled forms of the container without the use of adhesive tape.

11. The container of claim 10, wherein the longitudinal strap and the transverse strap are attached to one of the outer flaps on each of the top and bottom portions.

12. The container of claim 11, wherein the two pairs of straps are attached to outer flaps extending from the same side panel.

13. The container of claim 10, wherein the longitudinal strap has two end portions extending on opposite ends and the transverse strap has one end portion extending on the end that is opposite to the end which it is attached and releasable securing means are attached to the end portions, and the length of the end portions provides for attachment to the releasable securing means on the side panels.

14. The container of claim 10, wherein each flap to which said longitudinal and transverse straps are attached to further comprises releasable securing means positioned so that said end portions may be secured to the flap in a stowed position.

15. The container of claim 10, wherein the foldable material is at least one of paperboard, cardboard, or plastic, or combinations thereof.

16. The container of claim 10, wherein the longitudinal and transverse straps are made of plastic, natural fiber, synthetic fiber, animal hide, or elastic material, or combinations.

17. The container of claim 10, wherein the releasable securing means comprises hook and loop fasteners, press studs, latches, buckles, or magnets, adhesive, or combinations.

* * * * *